United States Patent
Galuten

(10) Patent No.: US 10,136,189 B2
(45) Date of Patent: Nov. 20, 2018

(54) METHOD AND SYSTEM FOR RE-AGGREGATION AND OPTIMIZATION OF MEDIA

(71) Applicant: Sony Interactive Entertainment LLC, San Mateo, CA (US)

(72) Inventor: Albhy Galuten, Santa Monica, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/895,846

(22) Filed: Feb. 13, 2018

(65) Prior Publication Data

US 2018/0234732 A1 Aug. 16, 2018

Related U.S. Application Data

(60) Provisional application No. 62/458,541, filed on Feb. 13, 2017.

(51) Int. Cl.
| | | |
|---|---|---|
| *H04N 21/466* | (2011.01) | |
| *H04N 21/478* | (2011.01) | |
| *H04N 21/258* | (2011.01) | |
| *H04N 21/442* | (2011.01) | |
| *H04N 21/45* | (2011.01) | |

(52) U.S. Cl.
CPC ... *H04N 21/4668* (2013.01); *H04N 21/25891* (2013.01); *H04N 21/44222* (2013.01); *H04N 21/4532* (2013.01); *H04N 21/4667* (2013.01); *H04N 21/47815* (2013.01)

(58) Field of Classification Search
CPC ......... H04N 21/4668; H04N 21/25891; H04N 21/44222; H04N 21/4532; H04N 21/4667; H04N 21/47815
See application file for complete search history.

(56) References Cited

U.S. PATENT DOCUMENTS

| | | | | |
|---|---|---|---|---|
| 2004/0221308 | A1* | 11/2004 | Cuttner | H04N 5/44543 725/46 |
| 2006/0015902 | A1* | 1/2006 | Matsuura | H04N 7/17318 725/46 |
| 2007/0288961 | A1* | 12/2007 | Guldi | H04N 7/0885 725/46 |
| 2010/0251305 | A1 | 9/2010 | Kimble et al. | |
| 2010/0325648 | A1* | 12/2010 | Matsuyama | G06Q 30/02 725/14 |
| 2012/0260214 | A1 | 10/2012 | Krishnamurthy et al. | |

(Continued)

OTHER PUBLICATIONS

PCT Application No. PCT/US2018/018053 International Search Report and Written Opinion dated Jul. 9, 2018.

*Primary Examiner* — Oleg Asanbayev
(74) *Attorney, Agent, or Firm* — Polsinelli LLP

(57) ABSTRACT

A media system for providing community and behaviorally driven content selection and bundling based on user consumption data and an analysis of user affinity. The media system performs user affinity representations and analyzes content affinity. The media system performs content affinity representations and maps content analysis into groups. The media system creates multi-dimensional arrays and uses for user content, maps pricing choices to subscriber value, and, using algorithms which may include Artificial Intelligence and Machine Learning approaches, maps groups to pricing choices.

15 Claims, 12 Drawing Sheets

(56) References Cited

U.S. PATENT DOCUMENTS

2014/0195919 A1 7/2014 Wieder
2015/0326688 A1* 11/2015 Aarnio .............. G06F 17/30029
　　　　　　　　　　　　　　　　　707/748

* cited by examiner

Figure 1 Architecture Overview

Figure 2 Consumption Analysis

Figure 3 Program Analysis

Figure 4 Content Affinity Analysis

Figure 8  Mapping Content Analysis to Channels or Bundles

Figure 9    Imputing Customer Value

Figure 10    Mapping of Bundles to Pricing Choices

Figure 11  Mapping of Pricing Choices to Imputed Value of Subscribers ial patent application 62/458,541 filed Feb. 13,
METHOD AND SYSTEM FOR RE-AGGREGATION AND OPTIMIZATION OF MEDIA

CROSS-REFERENCE TO RELATED APPLICATIONS

The present application claims the priority benefit of U.S. provisional patent application 62/458,541 filed Feb. 13, 2017, the disclosure of which is incorporated by reference herein.

BACKGROUND OF THE INVENTION

Field of the Invention

This application elates to multimedia, and more particularly to a system and method for data multimedia collection and analysis.

Description of the Related Art

The TV Viewing Service or multichannel video programming distributor (MVPD) universe is changing with companies offering smaller bundles of channels and the making of many channels available directly to consumers outside the traditional MVPD space. This "disaggregation" is causing much consumer difficulty as they try to aggregate channels for themselves.

Digital content distribution systems conventionally include a content server, a content player, and a communications network connecting the content server to the content player. The content server is configured to store digital content files, which can be downloaded from the content server to the content player. Each digital content file corresponds to a specific identifying title. The digital content file typically includes sequential content data, organized according to playback chronology, and may comprise audio data, video data, or a combination thereof.

A streaming media service generally includes a content server, a content player, and a communications network connecting the content server to the content player. The content server is configured to store (or provide access to) media content made available to end users. Media content may include movies, videos, music, games, social applications, etc.

SUMMARY OF THE PRESENTLY CLAIMED INVENTION

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later. In accordance with one or more aspects of the examples described herein, systems and methods are provided for providing community driven content.

In an aspect, a media system for providing community driven content determines user consumption data and analyzes user affinity. The media system performs user affinity representations and analyzes content affinity. The media system performs content affinity representations and maps content analysis into groups. The media system creates multi-dimensional arrays for user content, maps pricing choices to subscriber value, and maps groups to pricing choices.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for re-aggregation and optimization of media, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

The TV Viewing Service or multichannel video programming distributor (MVPD) universe is changing with companies offering smaller bundles of channels and the making of many channels available directly to consumers outside the traditional MVPD space. The present disclosure relates to collecting viewer usage and other data, mapping that to genre, sub-genre and other content-related data, comparing it to available channels, channel groups and programs to determine optimal content collections for particular users and groups of users. Further, the disclosure describes ways of taking these optimized content groupings and comparing them to various pricing options available based on contractual obligations and promotional opportunities additionally factoring in the value of customer acquisition and customer retention.

The present disclosure is a method and system for determining first the shows a consumer is most likely to want to watch based on an analysis of that user's historical consumption and other behaviors which is then mapped to analyses of possible content. The user is then mapped to other users with similar behavior which is then used to impute not only potential content choices but also to impute a customer value scale to determine the value of that customer. In parallel, content analysis is mapped to individual titles, channels and bundles. These potential bundles are mapped to various pricing choices including promotional opportunities. The pricing choices are then mapped to the imputed value of the subscribers to determine what bundles would be attractive to that consumer but further what bundled pricing is appropriate based on the value of that consumer.

Figure 1:
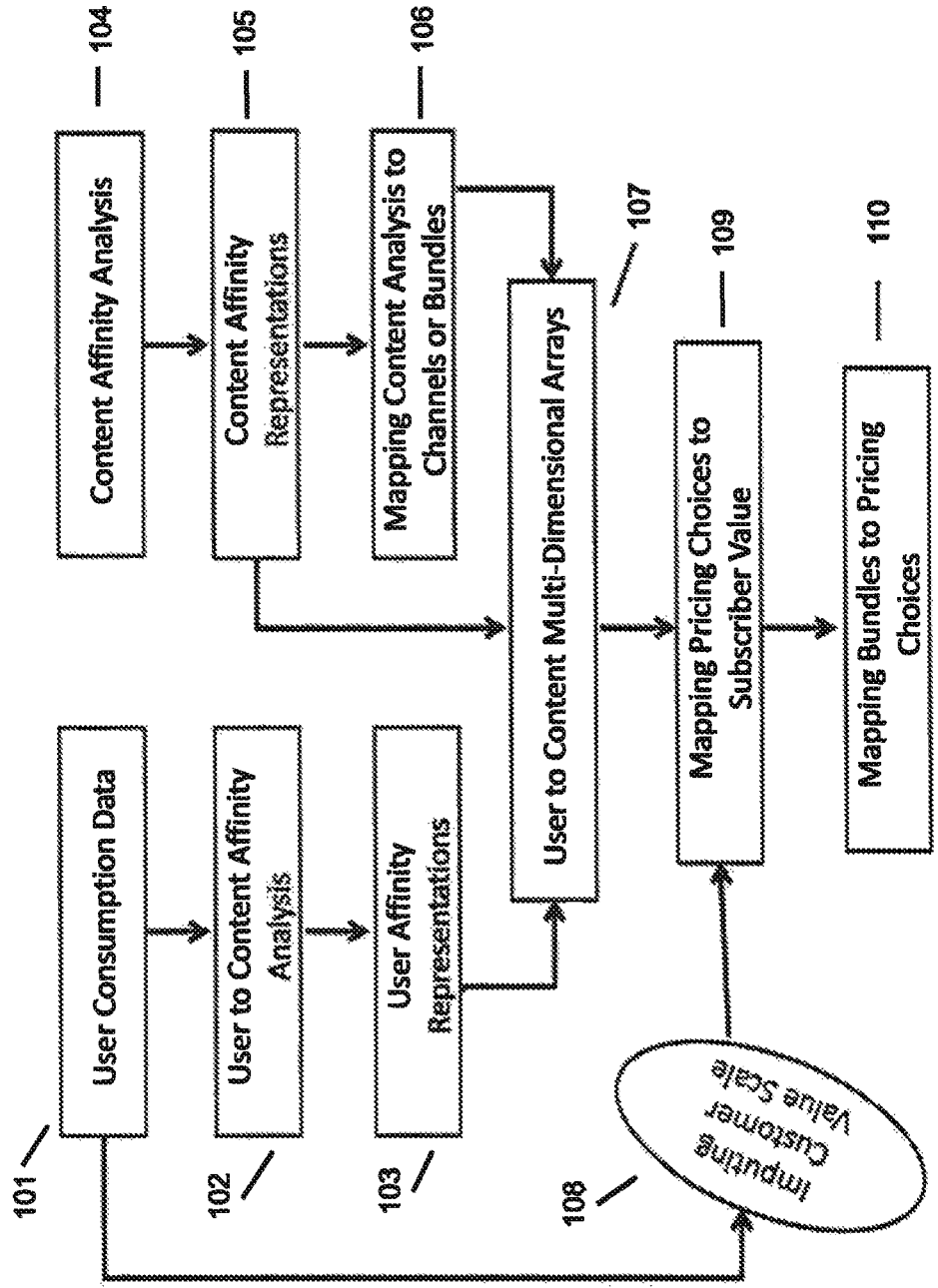
FIG. 1 illustrates a block diagram 100 of an example functional architecture for re-aggregation and optimization of media, according to one implementation of the invention.

FIG. 1 illustrates a block diagram 100 of an example functional architecture for re-aggregation and optimization of media, according to one implementation of the invention.

The media system includes a number of components which when taken together will provide the bundling together of content assets in ways that are most useful to a consumer and are easily explained and presented as bundles. The individual elements are described below in detail but the overall structure of the elements can be seen in FIG. 1 and described as follows.

First media system collects User Data either from monitoring user behavior, taking input from user surveys or by receiving data from third parties. This User Consumption Data (101) is where the system begins the analysis to determine the likes of the users and ultimately the relevance and value of various media choices to that user. Once media system have the data, it will perform analysis (102) to determine the affinity of each user or group of users to each piece of content or group of content. The output of the analysis of the user's affinity to various shows will be a set (or database) of User Affinity Representations (103). These data represent the affinity of each user or group of users to each show or group of shows.

Now the media system will perform an analysis of the various content elements (104) to determine their affinity relationships, that is not how they are broken down by genre, metadata, etc. but rather how they are broken down based on user affinity to them. From this the media system creates Content Affinity Representations (105). These are analogous to the User Affinity Representations above. Every show and group of shows has a correlation to every other show and every other group of shows and these are mapped (106) to the various channels and bundles of channels or bundles of shows.

Next the media system creates a set of Multi-Dimensional Arrays (107). The term "Multi-Dimensional Array" is known to have multiple meanings (one meaning in C++ programming, another in pure math, etc.). In the context of this disclosure, the intent is for "Multi-Dimensional Array" to have the broadest meaning possible. On the one hand it can be a pure mathematical representation but this should be taken to include large multi-faceted data sets as are used in Machine Learning, for example, as a training set. These Arrays (107) are created from an analysis of the relationship between the User Affinity Representations (103), the Content Affinity Representations (105) and the Mapping of Content Analysis to Channels and Bundles (106). This Multi-Dimensional Array (107) contains all the relational data among the various aspects of the user's content proclivities and the Content, Channel and Content Bundle proclivities.

In parallel, the media system generates an "Imputed Customer Value Scale" for each user and group of users based on usage, spending and other data. These Imputed Customer Value Scale representations are then mapped against the "User to Content Multi-Dimensional Arrays" to create a set of Pricing Choices as related to customer value (109). Once the media system knows the value to each consumer of each of the shows, channels and bundles, the media system can map those to the various pricing choices (110) and determine what offers to make to the various users or groups of users taking into account their probable affinity to the content and their price sensitivity.

Figure 2:
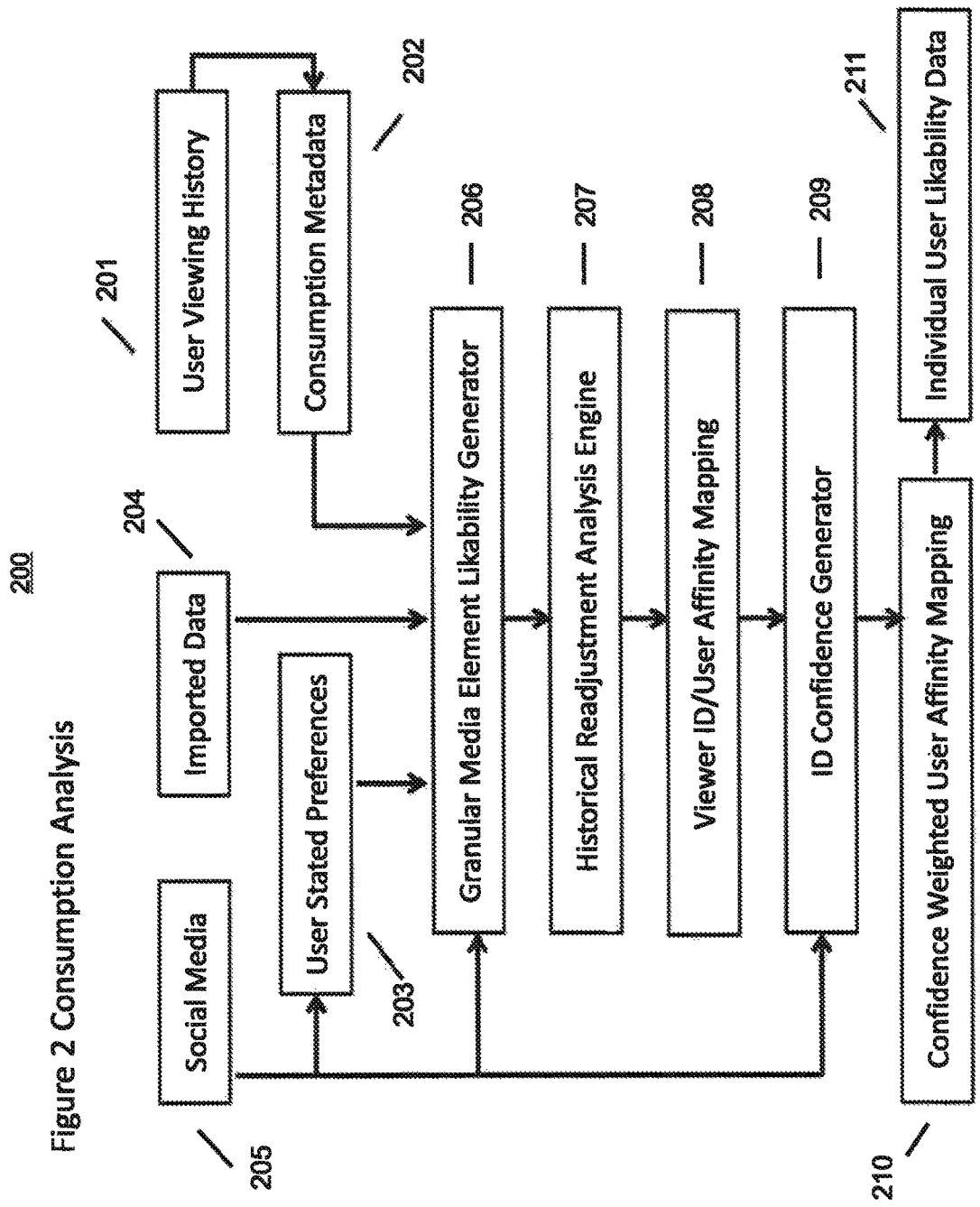
FIG. 2 illustrates a block diagram 200 of consumption analysis for re-aggregation and optimization of media, according to one implementation of the invention.

FIG. 2 illustrates a block diagram 200 of consumption analysis for re-aggregation and optimization of media, according to one implementation of the invention.

In order to generate an accurate analysis of a user's future patterns of consumption the media system will first analyze their current consumption, their stated and imputed preferences and temporally based usage patterns. As shown in FIG. 2, the media system begins with a viewer who may have been watching content on a platform for some time whose viewing history (201) is known and from that a set of consumption metadata (202) is created. The media system adds any stated viewing preferences from surveys or other explicit statements (203). Additionally, the media system may have received their history or preferences by importing or acquiring acquired from another service (204). Further, the media system can impute preferences from social media data (205). The media system then analyzes all the preference or consumption data to determine what content they will like in the future. This function is performed by the Granular Media Element Likability Generator (206). Using this, the media system creates a database of content associated with this user including a surmised measure of how much they liked each show.

All of the elements above (historical usage, imported historical usage, stated preferences, social media commentary) are weighted by the Likeability Generator (206) based on their expected value. For example the media system may predict that watching a show is twice as likely to predict watching the next episode of that show as giving it a "like" on social media. Initially, the media system creates values for these components based on educated guesses (an Expert System) for factors like repeat viewing, binge viewing, pausing, etc. to determine a likability scale for the user and their content. Actual viewing behavior is more valuable than survey data (to be weighted less heavily). The media system collects the movies, TV series, TV shows that have been watched and the video games that have been played. For video games, the media system includes the number of hours that have been spent playing the game as an indicator of affinity compensating for expected play time. So, for example if a game has been played but not to completion that is by default a lower rating than if a game has been played to completion. If a game has been played to completion and continues to be re-played after completion, that is an even stronger indication of affinity. For TV shows, the same kind of indicators can be used. A show that has not been watched to completion is less indicative of affinity than one that has been watched to completion and one that has been watched multiple times indicates even more affinity than that.

All of these factors are weighted over time based on the accuracy of the predictions using the Historical Readjustment Analysis Engine (207). The engine does looks at the weightings used in each decision and tracks how that decision actually worked out. For example, if, for a particular user it was assumed that: "If they have watched three consecutive shows in a season and then stopped that there is a likelihood that 45% of the time they will watch the 4th show in that season during the next week" and it turns out that the actual behavior (perhaps not individually but based on a contingent of similar users) only occurred 35% of the time, the algorithm for that user is adjusted going forward. Of course, the same methodology is used to continuously adjust the membership and scope of the contingent of users. As can be seen from the preceding example, there is no limit to the granularity that can be achieved—particularly as the cost of processing and data storage and manipulation continue to approach zero. Another example (useful when determining the value of a user) might be around the propensity to fast forward through or skip ads. This could be based on the type of show watched or the type of ad displayed or the time of day or the position in the show or the length of the ad. As artificial intelligence (AI) algorithms are updated, the above analyses will be a regular part of the process.

The Users in any household or other grouping may be multiple. First the User must be associated with the data set. Each User associated with the account is initially associated with the data collected for that account. This Viewer ID/User Affinity Mapping (208) initially maps all the data to all the users but, over time, based on data, each user will be analyzed separately.

The user to content affinities must be weighed against the likelihood that it is the viewer being analyzed is the viewer actually watching the show. This is determined by the ID Confidence Generator (209). This can be effectuated in a number of ways. First if the viewer is controlling the playback of the content with or on their mobile phone, it is much more likely that they are the viewer who usually uses that phone (or is registered to it) than if they are using a generic remote.

If the media system determines that multiple users are in the home, the media system can impute separate profiles even if they don't sign in as different users and in fact the media system can project multiple profiles on the same user based on their behavior at any one time. Here are some factors that can be used to predict the appropriate video profile for recommendation: genre & sub-genre, genre & sub-genre of show immediately preceding or immediately following the watched show, time of day, day of the week, time of the year, weather, frequency of pause, fast forward, rewind, amount of commercial skipping, sections repeated—particularly commercials repeated. Based on all the indications above, as well as account registration information, sign in information (not necessarily dispositive but often viable) the media system can estimate, based on the first few actions, which user is holding the remote. Particularly useful is when a user is using a mobile phone or other personal device to control the playback or search functionality as thee are generally individual user devices. Even for multiple user devices, motion detection and accelerometer functions in the controlling device can be used as input to the engine to help determine the likely holder of the device.

Now that the media system has an estimate of which user is controlling or viewing each content element, the media system can feed the weighting back into the Confidence Weighted User Affinity Mapping Engine (210) and have specific likability scores for each user and each piece of content. The likability scores are stored in the Individual User Likability Database (211). This data is also updated continuously over time as historical accuracy is used to readjust the parameters.

Even though the media system may use different profiles for recommendation at any one time, the total consumption behavior has to be taken into consideration together to predict content bundles to be included in a proposed subscription bundle.

Figure 3:
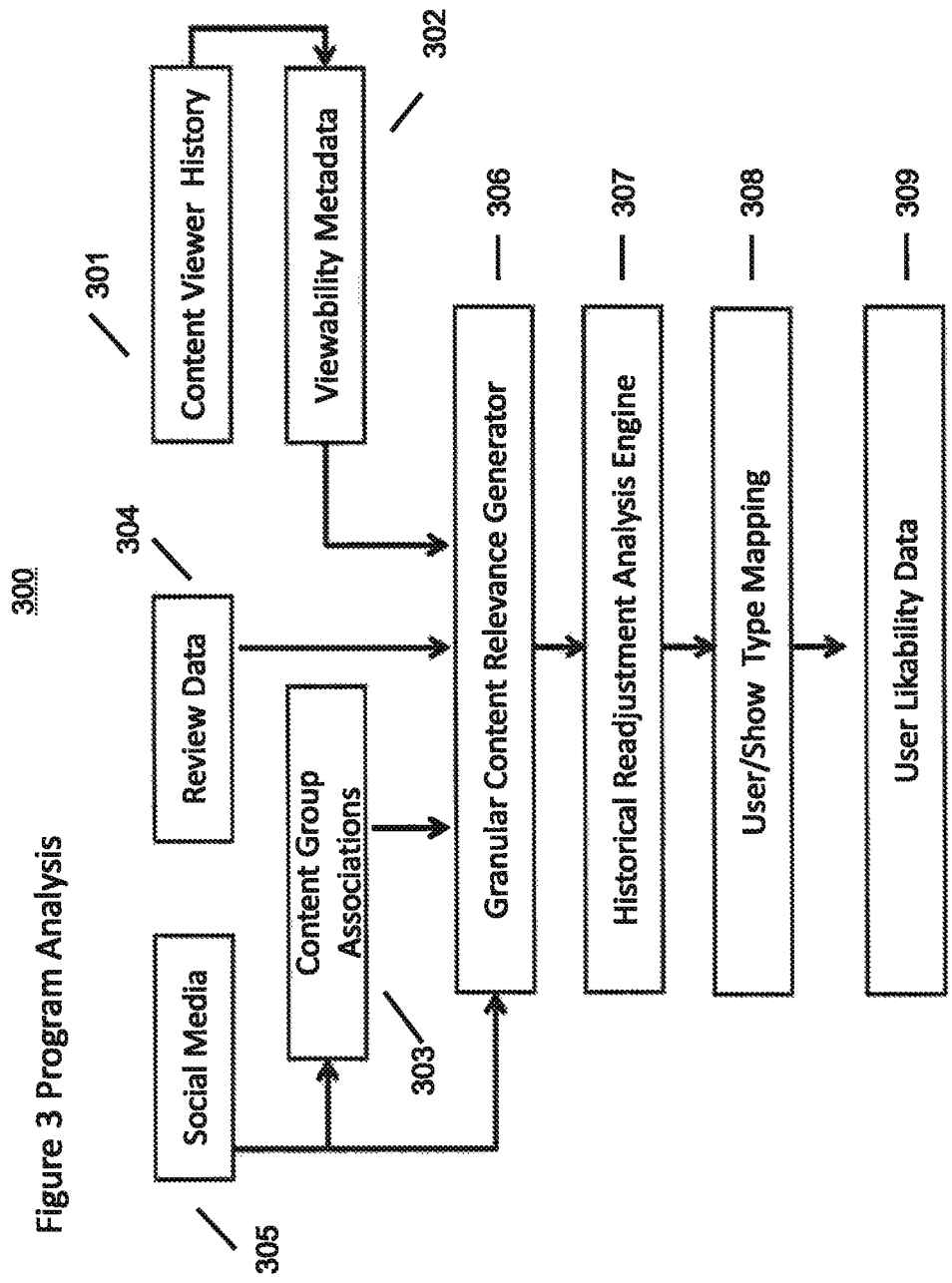
FIG. 3 illustrates a block diagram 300 of program analysis for re-aggregation and optimization of media, according to one implementation of the invention.

FIG. 3 illustrates a block diagram 300 of program analysis for re-aggregation and optimization of media, according to one implementation of the invention.

Just as the media system uses consumer behavior and discussion data to determine what content they might like, the media system can use the opposite approach to determine for each piece of content or bundle of content, which users it "likes." Though content doesn't actually like users, seeing the dyad of content to user affinity as well as the more traditional user to content affinity will undoubtedly yield useful results and it is not expected that the two approaches will be tautological. Using the same approach as above one can easily put each piece of content in the place of an individual user and determine which users each piece of content has an affinity for. FIG. 3 shows a similar approach as FIG. 2 except from the point of view of the content instead of the point of view of the user.

The media system begins with the Content Viewer History (301), that is, how the content is scored based on its users. From this the media system creates Viewability Metadata (302), essentially what contingent of users are attracted to this show (or from an analytics perspective, what people the show "likes"). In parallel, Social Media (305) is analyzed (based this time not on the users but on the content referenced by the users) and is used to create Content Group Associations (303). The Content group Associations along with Review Data (304)—based on publicly available reviews, blogs, comments, etc.—is analyzed along with the Viewability Metadata to create a Granular Content Relevance Generator (306).

The Granular Content Relevance Generator is continuously updated by the Historical Readjustment Analysis Engine (307) as in the previous FIG. 2 and discussion. Similar to the Consumption Analysis in FIG. 2, this is fed to a User/Show Type Mapping engine which should have outputs similar in construction to the Viewer ID/User Affinity Mapping (208) in the previous FIG. 2 except from a different perspective. As a result, the learning algorithms (to be used later) can work from the opposite side and better inform the cumulative data analysis. This is then used to create the User Likability Data (309)—essentially a measure of how much each show "likes" each user.

Figure 4:
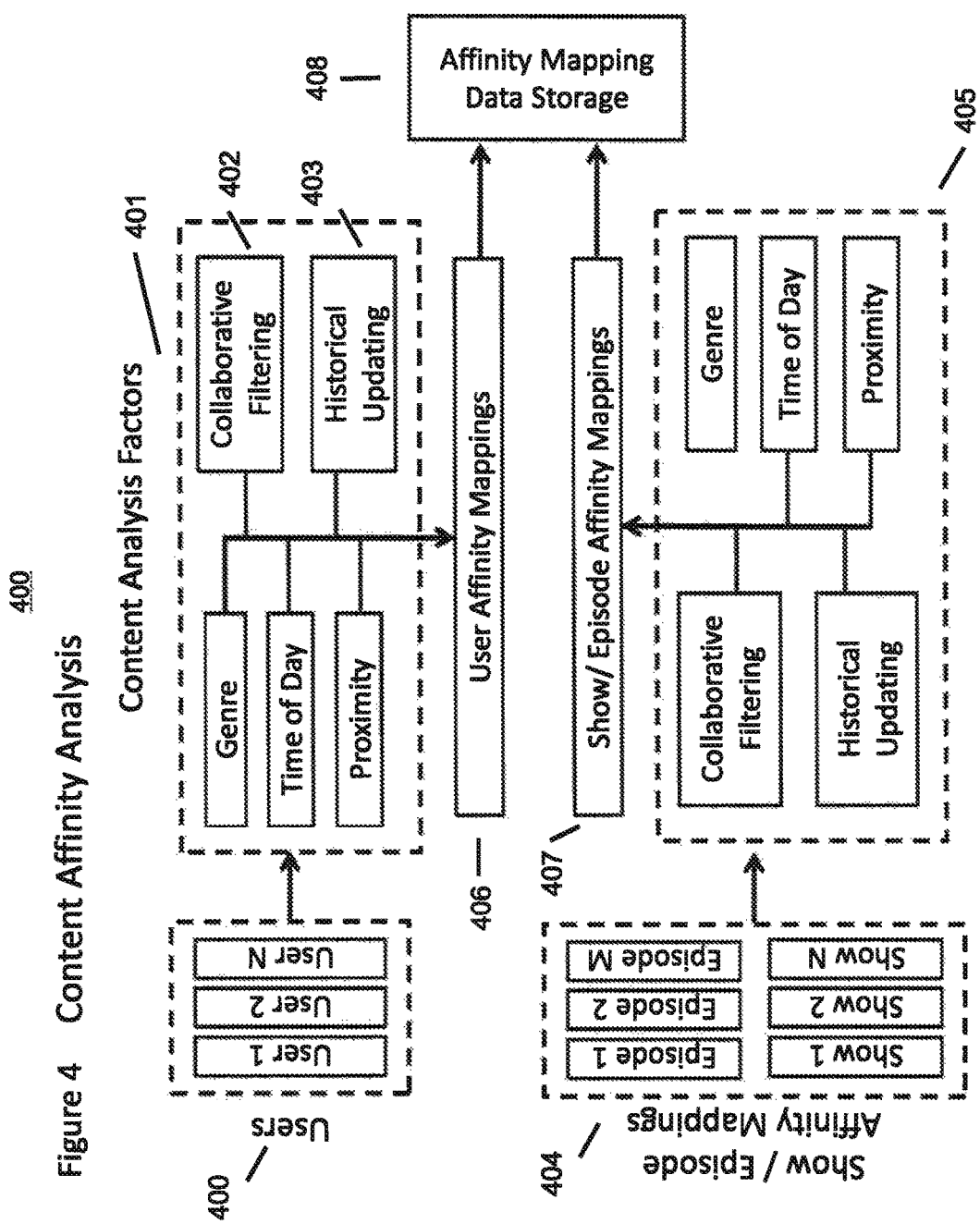
FIG. 4 illustrates a block diagram 400 of content affinity analysis for re-aggregation and optimization of media, according to one implementation of the invention.

FIG. 4 illustrates a block diagram 400 of content affinity analysis for re-aggregation and optimization of media, according to one implementation of the invention.

Individual Users (400) are analyzed individually and additionally (perhaps in retrospect) Users are analyzed in Groups. Individual Content Analysis (401) is made up of a number of factors:

Genre: as defined by show creators in metadata or as defined from scraping unstructured data from websites (including blogs and newspaper/magazine reviews), review aggregators (e.g. Rotten Tomatoes) or Social Network commentary (e.g. Facebook posts).

Time of day: Content may be more often consumed in the evening, in the morning, in the afternoon or after midnight. This can be used to weight the likelihood of a consumer wanting this content based on the time of day they are consuming.

Proximity: If someone consumes similar content in succession, it indicates a proclivity to binge within a genre while if they tend to switch genres, it indicates the opposite proclivity. This must be balanced against the likelihood of the "switcher" being, in fact, a different person. When switching indicates a group activity, the algorithm can be used to recommend content that the collaborative filtering algorithm has found to be common to both contingents.

Nuanced Collaborative Filtering (402): If I like A, B and C and others who like A, B and C also like X and Y, I will likely also enjoy X & Y. Seeing which users have watched or played a piece or set or genre of content and seeing what other content they have watched or played, the media system can then use that to infer what content others who like some of that content might like. This is then used to create an affinity sub-rating, which is, for example, that this content is not in genre X but is liked by people who like genre X. These affinity ratings are nuanced based on the value of the individual viewer—that is if a user likes a show at a 95 on a scale of 1 to 100, that weighting carries more weight than if their preference was only at a 15 out of 100. Unlike traditional Collaborative Filtering, where the analysis has traditionally been limited to simple comparative analysis, in this case the media system can use a much more detailed and nuanced approach. For example, a similar contingent might like a program to a degree of 85% when it first came out but another contingent might like it at 40% when it first came out. However, over time, say in 4 weeks, those numbers might be reversed. Based on which contingent a particular user is more highly correlated, the messaging about watching highly correlated material (e.g. the next episode in a series) might be timed differently. Using Artificial Intelligence algorithms, these relationships can be calculated with great specificity. A Machine Learning engine, for example, might use the initial data collected as a training set, then use that set to predict future guesses about user consumption, checking the accuracy of those assumptions as more data is gathered about actual behavior and that data is then fed into the training data to increase the accuracy. There is not the limitation of humans being able to imagine relationships in specificity but rather algorithms can approximate based on the results of various choices and fine tune themselves over time.

Historical Updating (403): There is a second generation and, in fact, continuing generations of analysis based on past affinity. If a suggestion turns out to be successful, the value of the linkage used to create that relationship is increased but if it turns out to be unsuccessful, the value of that linkage is diminished. This is a fuzzy relationship so that it is not binary, but weighted based on the level of success.

Now that the media systems have correlated the Users with the Content Analysis Factors, the media system store all those relationships in database (typically distributed), known as User Affinity Mappings (406).

When the media system takes these Genre Mappings and converts them to User Affinity Mappings, some elements may be highly correlated but the correlation may not necessarily be dispositive. For example, you have someone who likes juvenile humor as determined by the series and movies that they watch. Collaborative filtering might tell us that they will like an episode of a series that is not typically juvenile in its humor but is in one episode (or at least that episode is liked by people who like juvenile humor). So, as a result, the media system must look more deeply than the series or the show but look at how a show within a series can slant the results for the show and compensate for those distortions. This process feeds back into the content so that the media system uses those User Rating results to rate the programs. This back and forth from user ratings to show ratings and vice versa will fine tune the results over time and be used to inform any AI engine in use.

The media systems do not need labels because an Artificial Intelligence based or Machine Learning system can create representations of traits without knowing what those traits are. The media system is therefore not limited by the number of shows or genres. There is almost no limit to the number of aspects that an AI or Machine Learning system can create, pruning some over time and increasing the importance of others based on historical accuracy or additional collaborative filtering data. So the media systems use the affinity of consumers to specific shows to generate affinity relationships among that group of shows. Furthermore, the media system uses the level of that affinity (e.g. loosely correlated means 1 on a scale of 100 and highly correlated means 100 on a scale of 100) to determine the level of affinity of shows to each other. Though this mechanism can be used for making recommendations; it is not the intent here. The intent is to determine a more generalized sense of the kinds of things the user likes so that bundles can effectively be created.

The media system looks at the content elements that the consumer has watched—weighted against the imputed affinity to each content element (made up of all the factors above). The media system has dynamic groupings of content that the consumer likes and a Likability Score for each group of content.

The opposite or corollary of all of this is looking from the opposite direction. The media system can start with the Affinity Mappings of the Shows and Episodes (404) and use the same Content Analysis Factors as were used for the User Mappings but in reverse. The result will be Show and Episode Affinity Mappings (407). Both the User and the Show Affinity Mappings are stored in an Affinity Mapping Data Store (408).

Figure 5:
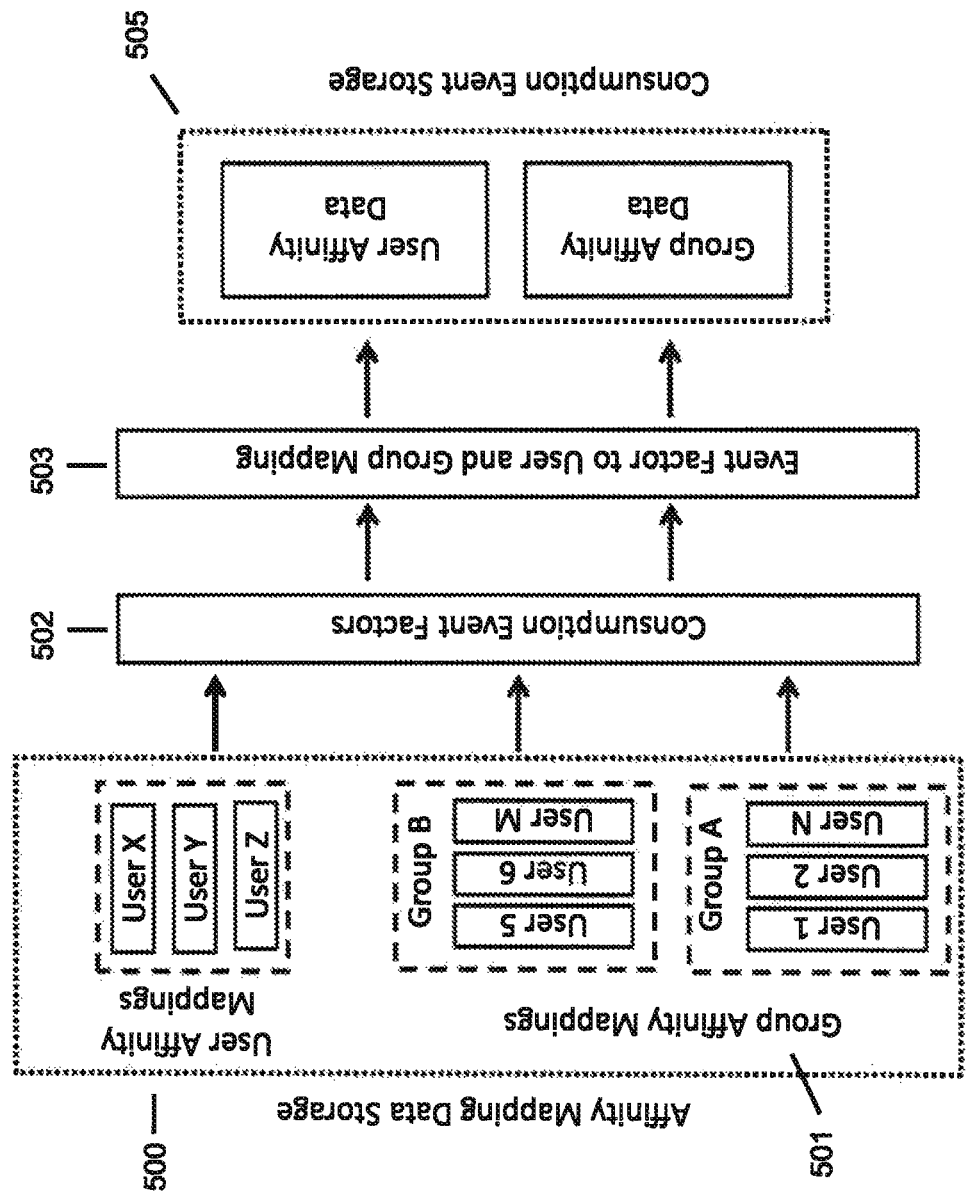
FIG. 5 illustrates a block diagram 500 of user affinity representations for re-aggregation and optimization of media, according to one implementation of the invention.

FIG. 5 illustrates a block diagram 500 of user affinity representations for re-aggregation and optimization of media, according to one implementation of the invention.

Beginning with the Affinity Mapping Data Storage (500 & 501—also 408 in FIG. 4) the media system can begin the process of creating User Affinity Representations. The media system can store a great amount of user data and an affinity number for each group of data (e.g. shows, channels, game genres, etc.) the media system can use to create a multi-dimensional array for that user's data. For example, if a consumer has a rating across consumption elements (for example, if for an ordered set of 16 factors, the users rating for each of those factors was 7.3.5.25.69.11.15.48.39.11.35.19.54.65.34.64). These elements or Consumption Event Factors (502) can be genres or a shows or channels as one dimension with user likability as a second dimension. A third dimension might be time of day or device of consumption or business model (e.g. own, rent, subscribe, etc.). In theory, there is no limit to the number of possible dimensions though, in practice, only using two or three may yield the best results.

Next the media system maps all of these Consumption Event Factors to Users and Groups of Users (503). Now you have multiple Consumption Factors which can be mapped in arbitrarily nuanced ways to User Affinity and group Affinity Data (505). As the algorithms plough through the data, different affinities will be reinforced and others will be attenuated. In this way, the media system now has a very detailed and actionable set of User and group data that the media system can use to define the value of each consumer and each group of consumer's affinity relationship to individual and groups of content.

Just as in earlier phases of the development, the viability of the results is tracked historically and is results driven so that if time of day turns out not to yield much value for some consumers, the weight of that dimension can be lowered. This array—changeable over time becomes the User Affinity Representation (UAR). A UAR can also be created for a group of users—say a household, a dorm or a zip code.

Figure 6:
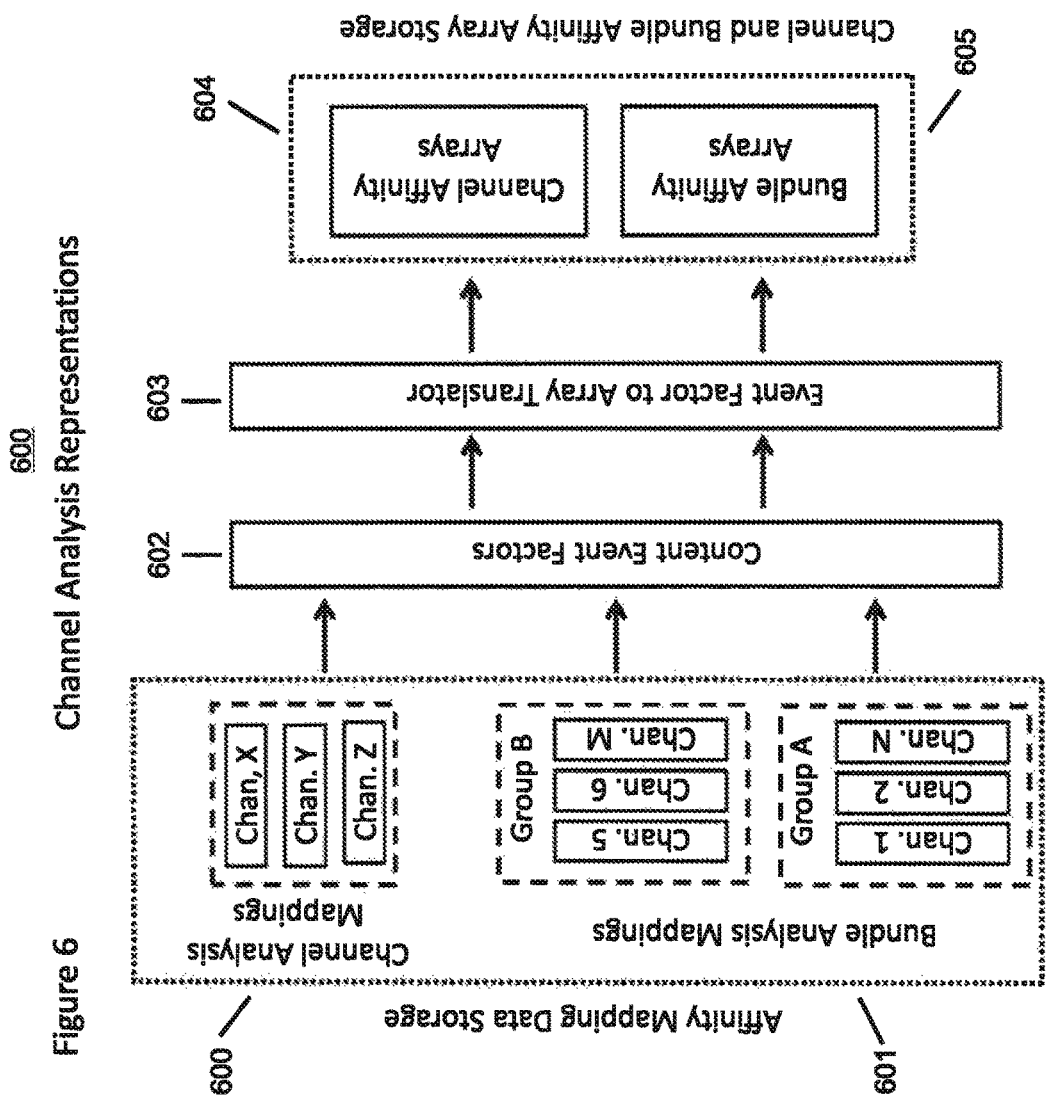
FIG. 6 illustrates a block diagram 600 of channel analysis representations for re-aggregation and optimization of media, according to one implementation of the invention.

FIG. 6 illustrates a block diagram 600 of channel analysis representations for re-aggregation and optimization of media, according to one implementation of the invention.

Similarly to the process for creating User Affinity Representations, a media system can create Channel Affinity Representation. FIG. 6 is very similar to FIG. 5 for User Affinity Analysis. As described above, just as a User has an affinity for a Show or Channel or Bundle, a Show, Channel or Bundle, a Show, Channel or Bundle has an affinity for a User. These inverted Analysis Affinity Mappings (600 & 601) create analogous Content Event Factors (602) which are mapped by the Event Factor to Array Translator (603) to the Channel and Bundle Affinity Arrays (604 & 605).

Figure 7:
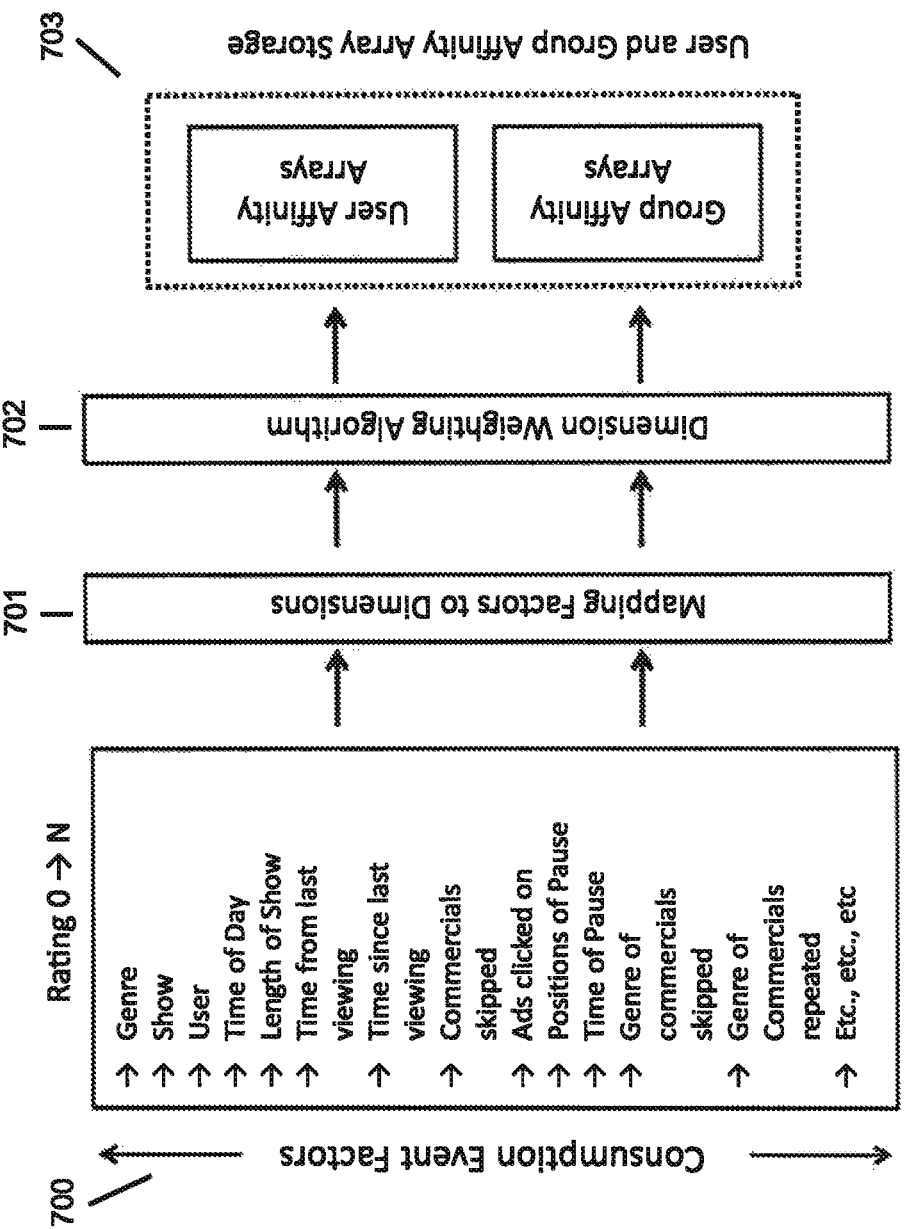
FIG. 7 illustrates a block diagram 700 of an multi-array for re-aggregation and optimization of media, according to one implementation of the invention.

FIG. 7 illustrates a block diagram 700 of a multi-array for re-aggregation and optimization of media, according to one implementation of the invention.

The media system use Multi-dimensional arrays to provide the detailed relevance and nuance to make Content/User analysis. The dimensions of the arrays can represent any aspect of the customer, program or service. In the Consumption Event Factors list (700), any number of possible factors are listed but they are by no means exhaustive. As the system gets smarter and smarter, many other factors will turn out to be relevant and many of these will prove to be inconsequential—these are just examples. In this process, the media system takes the various factors and maps them to separate dimensions (701). The media system does not need to use all the dimensions but can try different combinations for return on effort. Even if the media system limits a search to just few dimensions, the media system may weigh them based on importance using a Dimension Weighting Algorithm (702). As with other processes herein, the media system can begin with an expert system and then use the results to test our data. If a suggestion turns out to yield the appropriate user behavior, that approach is reinforced and if others do not yield results, that approach is diminished. Because the media system is not judging the results based on individual effectiveness but rather of the sum total of effectiveness, the media system can optimize the approach fairly quickly and assume that what works for most people will be the correct approach for each of the individuals. If there are outliers, the outliers will show up as a contingent groups and the algorithm or Learning Engine will be adjusted to apply to them as groups.

Figure 8:
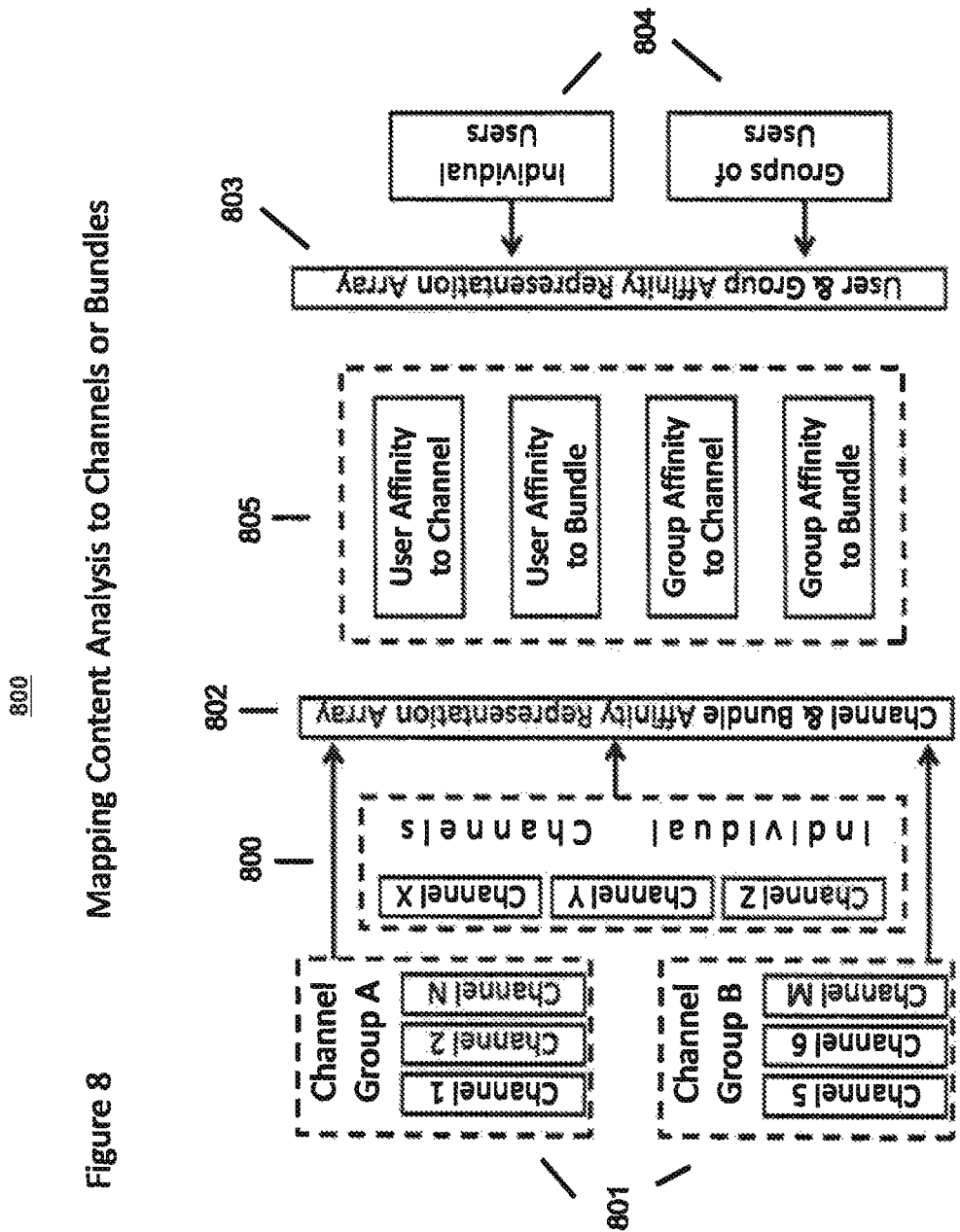
FIG. 8 illustrates a block diagram 800 of mapping content analysis to channels or bundles for re-aggregation and optimization of media, according to one implementation of the invention.

FIG. 8 illustrates a block diagram 800 of mapping content analysis to channels or bundles for re-aggregation and optimization of media, according to one implementation of the invention.

In order to effectively map the consumer to channels, shows or bundles the media system must map those content elements (channels, shows and bundles) to the likelihood of appreciation by each consumer or group of consumers (e.g. a household, neighborhood, college campus, etc.). In the same way that the media system mapped which shows a user liked and then which show a user is most likely to like, the media system can create a UAR for channels and bundles of channels as shown in FIG. 8. The media system may need to understand the personality or UAR of each Channel (800) or Bundle of Channels (801) so that the media system can see how closely each channel or bundle of channels maps to each user of group of users. Imagine that you have a user who watches one channel all day. What would their UAR look like across genres? That is an idealized rating for a watcher of that channel. Now imagine the same process for a bundle of channels (e.g. a Disney bundle which includes, Disney Channels, ESPN, ABC, etc.). The media system creates an idealized rating for a watcher of that channel and for a watcher of each group of channels. As can be dearly seen, if a consumer has a rating across consumption elements (say, our consumer with the 16 factors above: 7.3.5.25.69.11.15.48.39.11.35.19.54.65.34.64) and the set of channel ratings or aggregate of bundle of channels looks very similar, then the affinity of the consumer for that channel or bundle of channels is high. Conversely, if the match is not close, the rating is low. The closeness of the consumer rating to the channel rating and or bundle rating can be used to create a Channel Affinity Relationship (CAR) or Bundle Affinity Relationship (BAR) (802) between each user of group of users and each Channel or Bundle. Once the media system has the CAR mapping and BAR mappings, the media system can guess which content each consumer or group of consumers would most probably like. The media system already has the User & Group Affinity Representation Arrays (803) which the media system received from our Individual and Groups of Users (804). Now comparing the arrays (802 & 803) to each other the media system can generate User & Group Affinities to Channels and Bundles (805).

Figure 9:
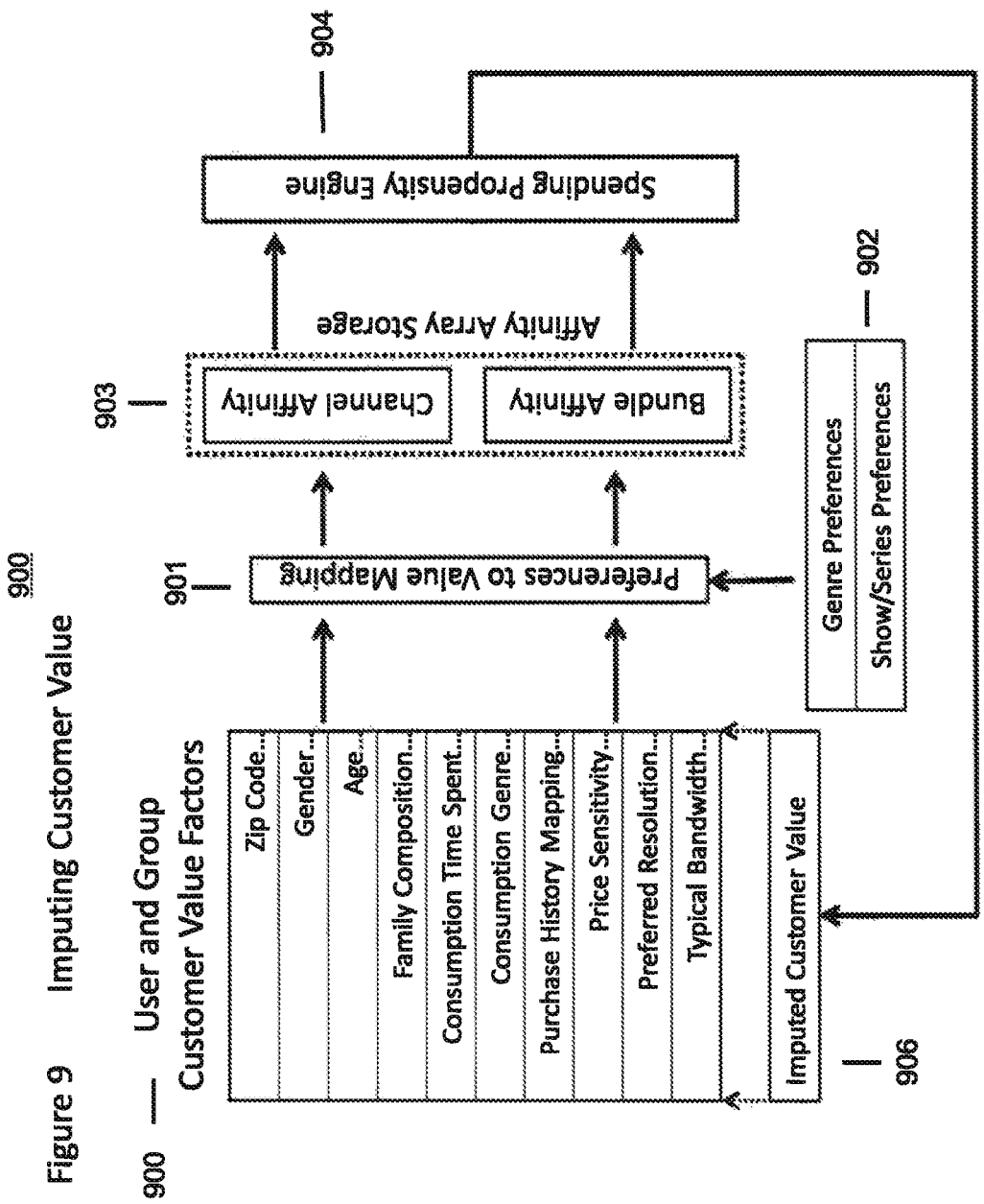
FIG. 9 illustrates a block diagram 900 of inputting customer value for re-aggregation and optimization of media, according to one implementation of the invention.

FIG. 9 illustrates a block diagram 900 of inputting customer value for re-aggregation and optimization of media, according to one implementation of the invention.

Different customers have differing value to a service. Some customers might spend a lot of money on various channel groups while others may only be interested in free content. Additionally, some may be targets for low budget consumables (like McDonalds) while others may be high value advertising targets (e.g. they might follow a link to a Porsche dealer and buy a car). It is reasonable to encourage high value customers as much as possible even to the point of losing money on some subscription bundles if they would generate other ancillary revenue. As seen in FIG. 9, the following mechanisms (900) can be used to impute value (this is a limited sub-set but the possible values are unlimited).

Zip Code
Gender
Age

Family composition (married? children? how many or what genre and age?)
Weekly time of Gaming consumption
Weekly time of Video consumption
Weekly time of Film consumption
Weekly time of TV consumption
Weekly time of Music consumption
Genre of consumption broken out separately in games, TV, music and film
Mapping all of the above against each other (e.g. TV comedy and first person shooter games)
Purchase history mapped against all of the above (e.g. how much and what does each child buy, etc.)
Time spent searching for lower price (e.g. if a user just buys the first instance of a title they are searching for as opposed to looking at different services for a lower price)
Click Likelihood (the likelihood of clicking on a link) based on previous behavior
Psychological Typing—data gathered from psychological tests (like Myers Briggs typing) or from imputed psychological characteristics based on behavior (e.g. people who hover over a link for a long time before clicking are more likely to be cautious in other decisions, game play, etc.)
Selected resolution (e.g. usually SD or usually HD or UHD whenever possible)
Bandwidth to the device In the same way that the media system created the Channel Affinity Relationships (CARs) or Bundle Affinity Relationship (BARs), the media system can create an Imputed Customer Value (ICV) as one dimension of an array which can be used by our learning (AI/ML) systems. In order to determine the ICV, the media system starts with the User and Group Customer Value Factors (900, as above) and looks at them in relationship to the User's or Group of User's Genre and Show preferences (902) to generate a Preferences to Value Mapping (901). This mapping is a two dimensional array with content preferences in one dimension and Customer Value Factors in the other dimension.

The array is then added to the arrays of Affinity Storage (903). Now the media system takes all of this data and the media system maps the spending propensity to each channel and bundle of channels. So if customer A is liable to spend a lot of money on the golf channel, which creates a high Spending propensity for that channel. Alternatively, the same user could have a low spending propensity for Nickelodeon. These propensities are then fed back into the User and Group Customer Value Factors and stored as another set of fields or dimension in the multi-dimensional array. Now that the media system knows the imputed value of each consumer to each show, channel and bundle, the media system can begin to perform the analysis required to determine which programs are worth how much to each consumer or group of consumers.

Figure 10:
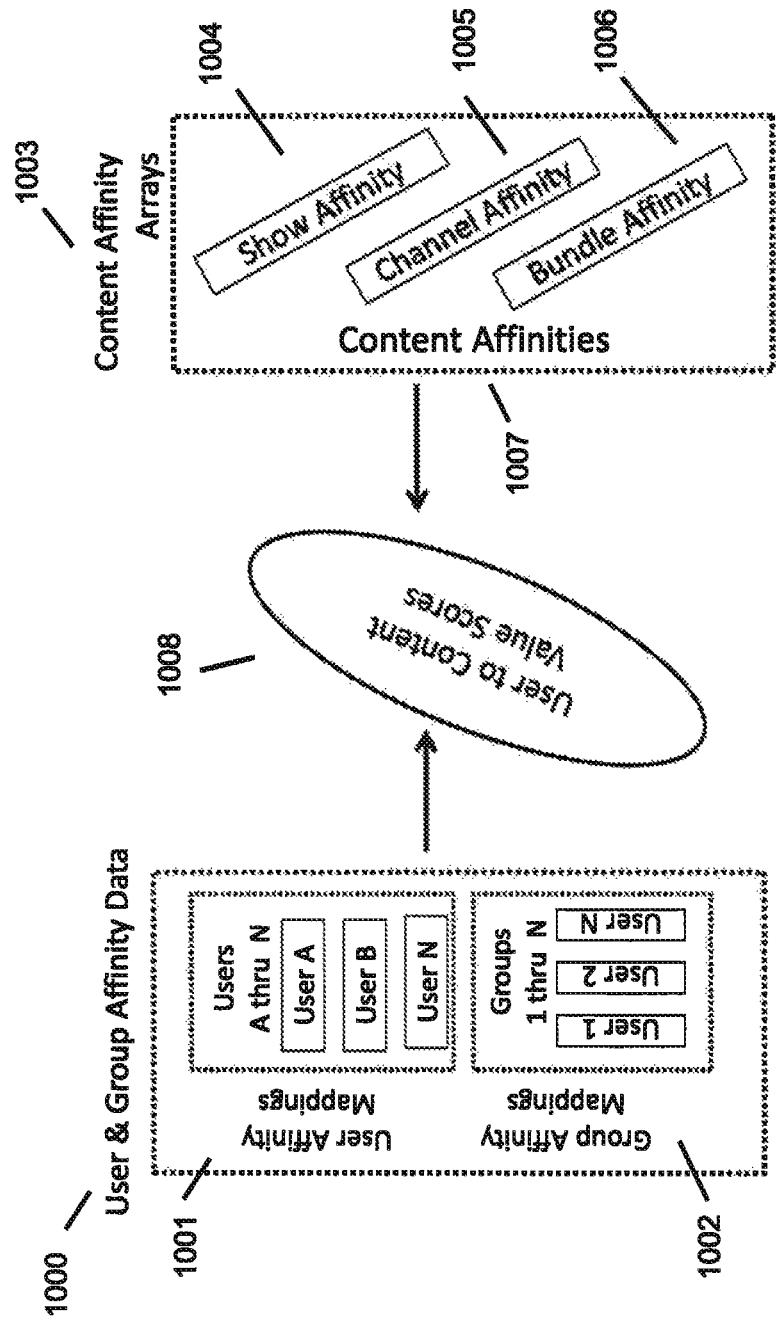
FIG. 10 illustrates a block diagram 1000 of mapping bundles to pricing choices for re-aggregation and optimization of media, according to one implementation of the invention.

FIG. 10 illustrates a block diagram 1000 of mapping bundles to pricing choices for re-aggregation and optimization of media, according to one implementation of the invention.

Now that the media system has Channel Affinity Relationships (CARs) or Bundle Affinity Relationship (BARs), and Imputed Customer Value (ICV) arrays that can be used by the learning systems, the media system can look at the the channels and channel bundles the user is most likely to enjoy, and the likelihood to spend for those channels and bundles.

As previously discussed in the section on Channel Analysis Representations, the media system has Group and User Affinity arrays (1000, 1001 & 1002), which describe the affinity each user or group of users has to each piece or collection of content (show, series, channel, group of channels, etc.). At the same time, the media system has a complete set of Content Affinity Arrays (1003). These are collectively made from the analysis of each Show Affinity (1004), each Channel Affinity (1005) and each Bundle Affinity (1006). Bundles can be any collection of Channels. They could be a collection of channels as provided by one content provider (i.e. Disney owns ABC, Disney Family, A&E Networks and ESPN which are often sold to MVPDs as a Bundle) or it could be a bundle created internally (say premium channels including Starz, HBO and Showtime). Because of the proliferation of cloud computing and cloud storage, there is no limit to the number of possible virtual channels and these can be created by intuitive programmers or by algorithms based on customer usage. These Show, Channel and Bundle Affinities are collectively referred to simply as Content Affinities (1007).

The media system now has User and Group Affinities (1000) and Content Affinities (1007). By mapping the two arrays against each other the media system can create a User to Content Value Score (UCVS) (1008). The score tells the media system the value of each show, channel or bundle to each consumer or group of consumers.

Figure 11:
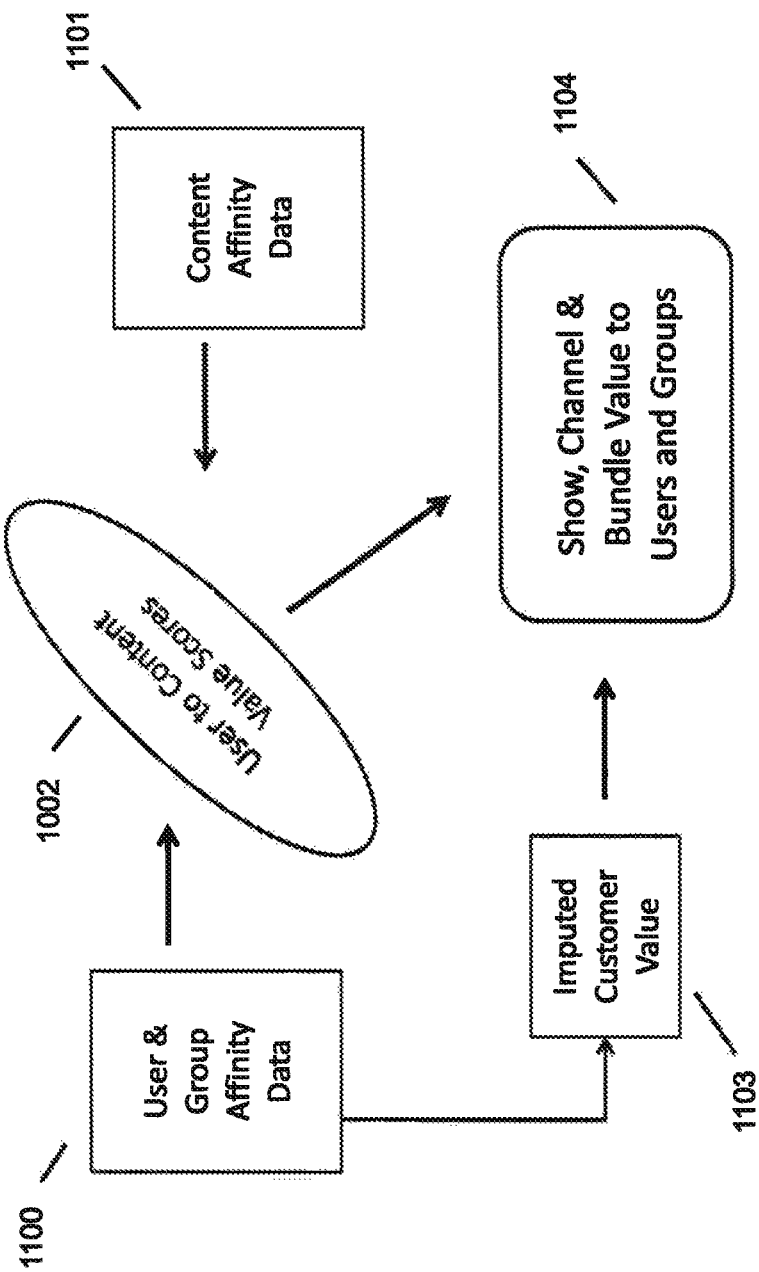
FIG. 11 illustrates a block diagram 1100 of mapping pricing choices to imputed value of subscribers for re-aggregation and optimization of media, according to one implementation of the invention.

FIG. 11 illustrates a block diagram 1100 of mapping pricing choices to imputed value of subscribers for re-aggregation and optimization of media, according to one implementation of the invention.

User Affinity Data (1100) has been mapped against Content Affinity Data (1101) to create a set of User to Content Value Scores (1102). Additionally, the media system has created Imputed Customer Value Scores (1103) based on those Users and Groups.

Now the final stage of this exercise is to map the UCVS to the available channels and bundles. Based initially or intelligent guesses—an Expert System generated by experts in the field begins with cost values associated with each channel or bundle of channels—e.g. this user would pay $2/month for ABC but only $1/month for CBS. These cumulative values are compared with the cost of adding those channels to a bundle—taking into account that some bundles may not be able to be separated. So for example, if I must take ABC with ESPN because of our agreements with the Walt Disney Company, those prices must be factored together. Now the media system has various sets of content bundles that the media system can create for individual users and expected prices they might pay. This will give us some initial offers—and probably the best offers for that particular user. For example, the media system can create two or three bundles customized for a user with the optimal pricing for them.

As one additional layer to the ability to make appropriate offers to consumers, the media system may factor in the value of that consumer. To do this, the media system use an Imputed Additional Value to determine how much additional revenue the media system might accrue from that subscriber. Possible areas that may imply additional revenue include interactive advertising which carries very high CPMs (including direct payments for referrals) and likelihood to buy or rent additional games or movies or TV shows based on staying within our ecosystem as opposed to launching another provider which can take user engagement away from the media system.

Figure 12:
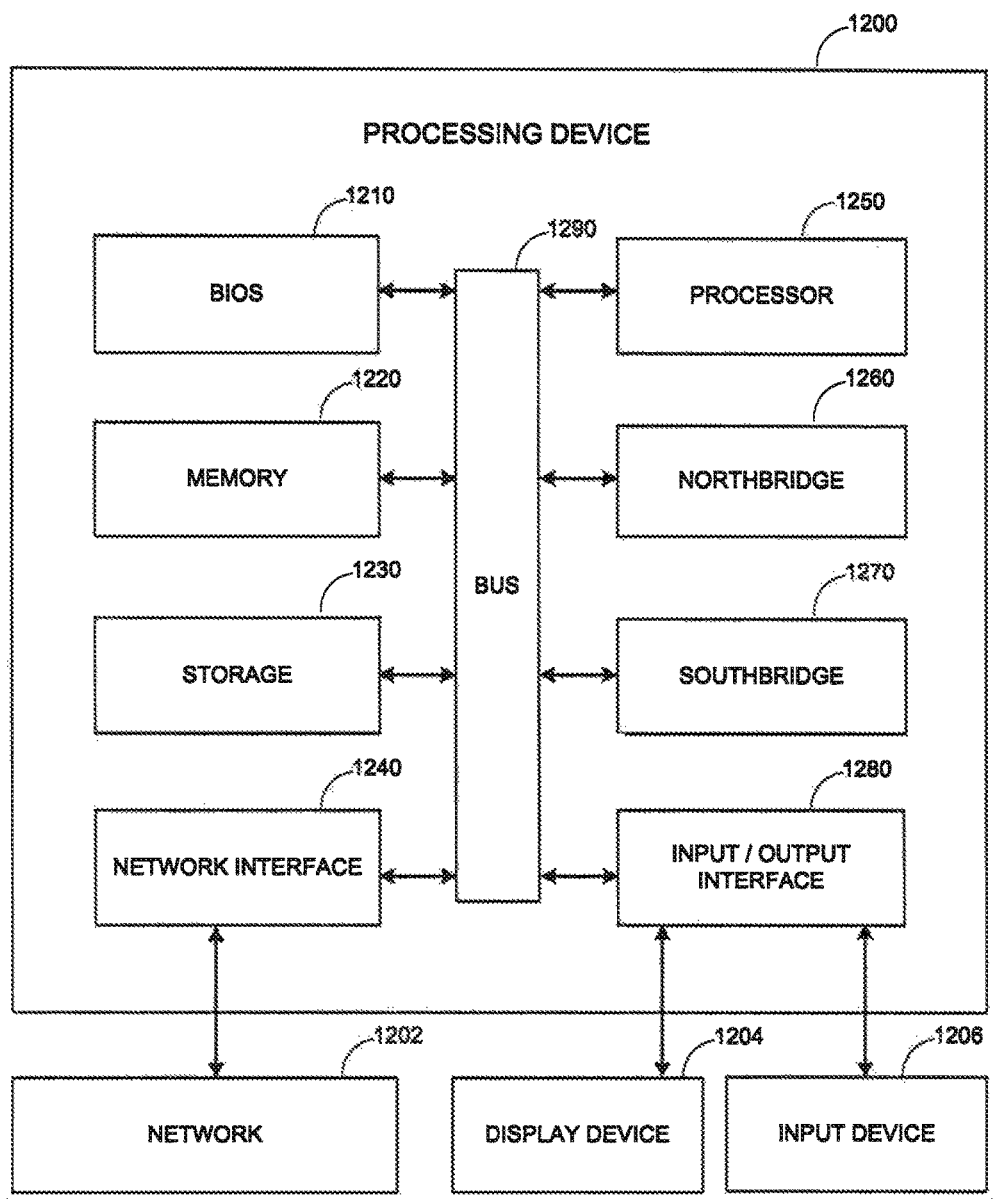
FIG. 12 illustrates a block diagram of an example processing device.

FIG. 12 illustrates a block diagram of an example processing device 1200. The processing device 1200 can include a Basic Input/Output System (BIOS) 1210, a memory 1220, a storage 1230, a network interface 1240, a processor 1250, a northbridge 1260, a southbridge 1270, and an input/output (10) interface 1280.

The processing device 1200 can be any apparatus for processing data, such as for example, a server computer (e.g., one of many rack servers in a data center), a personal computer, a laptop computer, a smartphone, a tablet, an entertainment console, a wearable device, or a set top box. The processor (e.g., central processing unit (CPU)) 1250 can be a chip on a motherboard that can retrieve and execute programming instructions stored in the memory 1220. The processor 1250 can be a single CPU with a single processing core, a single CPU with multiple processing cores, or multiple CPUs. One or more buses 1290 can transmit instructions and application data between various computer components such as the processor 1250, memory 1220, storage 1230, and networking interface 1240.

The memory 1220 can include any physical device used to temporarily or permanently store data or programs, such as various forms of random-access memory (RAM). The storage 1230 can include any physical device for non-volatile data storage such as a HDD or a flash drive. The storage 1230 can often have greater capacity than the memory 1220 and can be more economical per unit of storage, but can also have slower data transfer rates.

The BIOS 1210 can include a Basic Input/Output System or its successors or equivalents, such as an Extensible Firmware Interface (EFI) or Unified Extensible Firmware Interface (UEFI). The BIOS 1210 can include a BIOS chip located on a motherboard of the processing device 1200 storing a BIOS software program. The BIOS 1210 can store firmware executed when the computer system is first powered on along with a set of configurations specified for the BIOS 1210. The BIOS firmware and BIOS configurations can be stored in a non-volatile memory (e.g., NVRAM) 1212 or a ROM such as flash memory. Flash memory is a non-volatile computer storage medium that can be electronically erased and reprogrammed.

The BIOS 1210 can be loaded and executed as a sequence program each time the processing device 1200 is started. The BIOS 1210 can recognize, initialize, and test hardware present in a given computing system based on the set of configurations. The BIOS 1210 can perform self-test, such as a Power-on-Self-Test (POST), on the processing device 1200. This self-test can test functionality of various hardware components such as hard disk drives, optical reading devices, cooling devices, memory modules, expansion cards and the like. The BIOS can address and allocate an area in the memory 1220 in to store an operating system. The BIOS 1210 can then give control of the computer system to the OS.

The BIOS 1210 of the processing device 1200 can include a BIOS configuration that defines how the BIOS 1210 controls various hardware components in the processing device 1200. The BIOS configuration can determine the order in which the various hardware components in the processing device 1200 are started. The BIOS 1210 can provide an interface (e.g., BIOS setup utility) that allows a variety of different parameters to be set, which can be different from parameters in a BIOS default configuration. For example, a user (e.g., an administrator) can use the BIOS 1210 to specify dock and bus speeds, specify what peripherals are attached to the computer system, specify monitoring of health (e.g., fan speeds and CPU temperature limits), and specify a variety of other parameters that affect overall performance and power usage of the computer system.

The I/O interface 1280 allows the processing device 1200 to connect with I/O devices such as a keyboard, a mouse, a remote control, a controller, a microphone, a television, a head mounted display (HMD), and/or a monitor, etc.

The northbridge 1260 can be a chip on the motherboard that can be directly connected to the processor 1250 or can be integrated into the processor 1250. In some instances, the northbridge 1260 and the southbridge 1270 can be combined into a single die. The northbridge 1260 and the southbridge 1270, manage communications between the processor 1250 and other parts of the motherboard. The northbridge 1260 can manage tasks that require higher performance than the southbridge 1270. The northbridge 1260 can manage communications between the processor 1250, the memory 1220, and video controllers (not shown). In some instances, the northbridge 1260 can include a video controller.

The southbridge 1270 can be a chip on the motherboard connected to the northbridge 1260, but unlike the northbridge 1260, is not directly connected to the processor 1250. The southbridge 1270 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the processing device 1200. The southbridge 1270 can be connected to or can include within the southbridge 1270 the I/O interface 1270, Direct Memory Access (DMAs) controllers, Programmable Interrupt Controllers (PICs), and a real-time dock.

The input device 1202 can be at least one of a game controller, a joystick, a mouse, a keyboard, a touchscreen, a trackpad, microphone, camera, or other similar control device. The input device 1202 allows a user to provide input data to the processing device 1200.

The display device 1204 can be at least one of a monitor, a light-emitting display (LED) screen, a liquid crystal display (LCD) screen, a head mounted display (HMD), a virtual reality (VR) display, a augmented reality (AR) display, or other such output device. The display device 1204 allows the processing device 1200 to output visual information to a user.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A system for digital content filtering and multi-dimensional analysis, the system comprising:
   a content server that stores a plurality of digital content files, each digital content file comprising sequential content data;
   a user database that stores user data arrays, wherein each user data array is specific to a respective user and includes a set of content factors, and wherein each content factor in the set of content factors is associated with a likability metric specific to the respective user;
   a content database that stores content data arrays, wherein each content data array is specific to a respective content title and includes a set of content elements, and wherein each content element in the set of content elements is associated with an affinity metric specific to the respective content title; and
   a media analysis server that:
   selects a plurality of dimensions from the set of content factors and the set of content elements;
   creates a multi-dimensional content array for a requesting user based on the selected plurality of dimensions that are found in a user data array specific to the requesting user and in one or more content data arrays; and
   generates the content data arrays and the user data array specific to the requesting user.

2. The system of claim 1, wherein the media analysis server generates the user data array specific to the requesting user based on current content consumption data associated with the requesting user.

3. The system of claim 2, wherein the current content consumption data includes at least one of viewing history, imported historical data, survey responses, express preferences, and social media activity.

4. The system of claim 2, wherein the media analysis server generates the user data array specific to the requesting user by assigning a weight to each content factor and determining the likability metric for each content factor based on the assigned weight.

5. The system of claim 4, wherein the media analysis server further updates the weight assigned to each content factor based on a disparity between the determined likability metric and new content consumption data associated with the requesting user.

6. The system of claim 1, wherein the user database further includes at least one data array associated with a group of users, and wherein the media analysis server generates a plurality of user data arrays, each user data array specific to a different user in the group based on one or more tracked indicators and an assigned degree of confidence associated with the tracked indicators.

7. The system of claim 1, wherein the media analysis server generates the multidimensional content array based on at least one other user data array specific to another user identified as similar to the requesting user.

8. A method for digital content filtering and multi-dimensional analysis, the method comprising:
   storing a plurality of digital content files in a content server, each digital content file comprising sequential content data;
   storing user data arrays in a user database, wherein each user data array is specific to a respective user and includes a set of content factors, and wherein each content factor in the set of content factors is associated with a likability metric specific to the respective user;
   storing content data arrays in a content database, wherein each content data array is specific to a respective content title and includes a set of content elements, and wherein each content element in the set of content elements is associated with an affinity metric specific to the respective content title;
   selecting a plurality of dimensions from the set of content factors and the set of content elements;
   creating a multi-dimensional content array for a requesting user based on the selected plurality of dimensions that are found in a user data array specific to the requesting user and in one or more content data arrays; and
   generating the content data arrays and the user data array specific to the requesting user.

9. The method of claim 8, wherein generating the user data array specific to the requesting user is based on current content consumption data associated with the requesting user.

10. The method of claim 9, wherein the current content consumption data includes at least one of viewing history, imported historical data, survey responses, express preferences, and social media activity.

11. The method of claim 9, wherein generating the user data array specific to the requesting user comprises assigning a weight to each content factor and determining the likability metric for each content factor based on the assigned weight.

12. The method of claim 11, further comprising updating the weight assigned to each content factor based on a disparity between the determined likability metric and new content consumption data associated with the requesting user.

13. The method of claim 8, further comprising storing at least one data array associated with a group of users, and generating a plurality of user data arrays, each user data array specific to a different user in the group based on one or more tracked indicators and an assigned degree of confidence associated with the tracked indicators.

14. The method of claim 8, wherein generating the multi-dimensional content array is further based on at least one other user data array specific to another user identified as similar to the requesting user.

15. A non-transitory computer-readable storage medium, having embodied thereon a program executable by a processor to perform a method for digital content filtering and multi-dimensional analysis, the method comprising:

storing a plurality of digital content files in a content server, each digital content file comprising sequential content data;

storing user data arrays in a user database, wherein each user data array is specific to a respective user and includes a set of content factors, and wherein each content factor in the set of content factors is associated with a likability metric specific to the respective user;

storing content data arrays in a content database, wherein each content data array is specific to a respective content title and includes a set of content elements, and wherein each content element in the set of content elements is associated with an affinity metric specific to the respective content title;

selecting a plurality of dimensions from the set of content factors and the set of content elements;

creating a multi-dimensional content array for a requesting user based on the selected plurality of dimensions that are found in a user data array specific to the requesting user and in one or more content data arrays; and generating the content data arrays and the user data array specific to the requesting user.

* * * * *